March 17, 1925.
C. L. MICHOD
VEHICLE SHIPPING DEVICE
Filed June 4, 1923
1,529,901
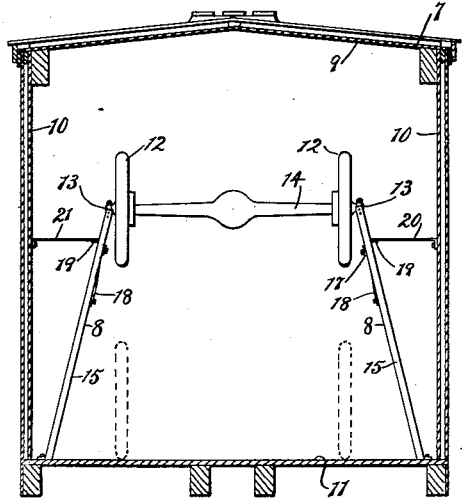
Fig.1.
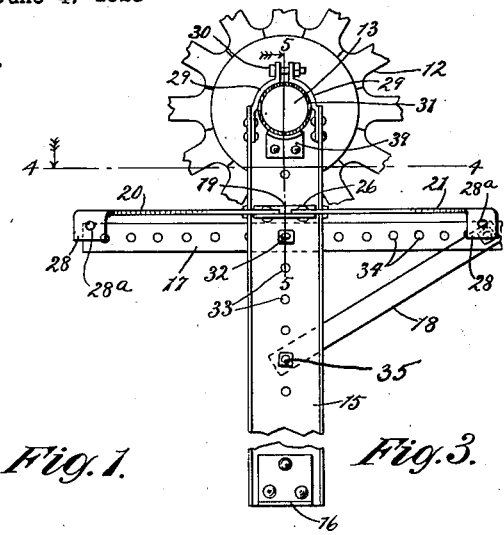
Fig.3.
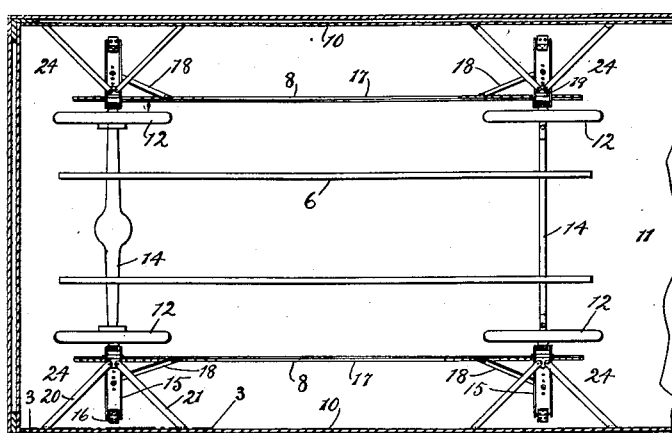
Fig.2.
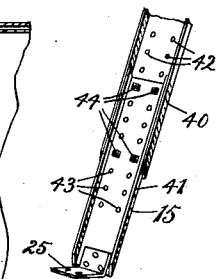
Fig.6.
Fig.5.
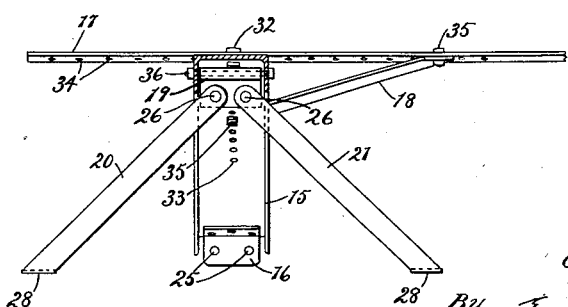
Fig.4.
Inventor:
Charles L. Michod
By Ernest C. Tupes
Atty.

Patented Mar. 17, 1925.

1,529,901

UNITED STATES PATENT OFFICE.

CHARLES L. MICHOD, OF CHICAGO, ILLINOIS, ASSIGNOR, BY MESNE ASSIGNMENTS, OF ONE-HALF TO THE STUDEBAKER CORPORATION, OF SOUTH BEND, INDIANA, A CORPORATION OF NEW JERSEY, AND ONE-HALF TO THE COPONY AUTO LOADING COMPANY, OF DETROIT, MICHIGAN, A CORPORATION OF MICHIGAN.

VEHICLE SHIPPING DEVICE.

Application filed June 4, 1923. Serial No. 643,139.

*To all whom it may concern:*

Be it known that I, CHARLES L. MICHOD, a citizen of the United States, and resident of Chicago, county of Cook, and State of Illinois, have invented certain new and useful Improvements in Vehicle Shipping Devices, of which the following is a specification, and which are illustrated in the accompanying drawings, forming a part thereof.

This invention relates to an improved vehicle shipping device and more particularly to a device adapted for supporting automobiles in the upper part of a freight car at sufficient height to permit another automobile to be positioned underneath and thereby double the carrying capacity of the car.

Devices of this character as heretofore constructed generally provide separate axle or hub supports for each wheel and utilize the vehicle frame as a connecting member between the supports so that the vehicles are frequently damaged in transit as a result of careless switching or other rough usage to which freight cars are often subjected and one of the objects of this invention is the provision of a unitary device which is adapted to support one entire side of the vehicle and to relieve the vehicle frame of such travelling or switching strains when in transit.

Such unitary structures as have heretofore been provided for supporting one entire side of the vehicle are unwieldly and incapable of being collapsed and as a result their size and bulk renders reshipment to the factory impracticable because of excessive freight charges and a further object of the invention is to provide such a device made up of members pivotally and adjustably connected to form a trussed frame which, when not in use, may be easily collapsed and folded up and the members nested together to occupy a relatively small space so that reshipment to the factory at a low freight is practicable and economies from repeated use are made possible.

A further object is the provision of a device which has its main members especially adapted for construction of standard rolled shapes whereby the expense of fabrication and manufacture may be minimized.

A still further object is the provision of a device which is adjustable to automobiles of different weights and sizes of wheel bases whereby they may be interchangeably used on trucks and passenger vehicles of different sizes.

The invention further resides in such features of construction and arrangement of parts and combinations as will hereinafter appear.

Referring to the accompanying drawings:—Figure 1 is a cross sectional view of a freight car showing an automobile frame supported therein in accordance with one of the embodiments of the invention, the body of the automobile being omitted as not necessary to the disclosure of the invention and the frame being shown diagrammatically. Figure 2 is a plan sectional view of the same. Figure 3 is a detail view on a larger scale taken along the line 3—3 of Figure 2. Figure 4 is a detail view along the line 4—4 of Figure 3. Figure 5 is a sectional view along the line 5—5 of Figure 3, and Figure 6 is a detail view of an alternative form of supporting member.

As shown in Figs. 1 and 2, an automobile frame generally designated as 6 is supported in a freight car 7 by a pair of supporting members 8 at a sufficient height above the car floor 11 to provide clearance underneath for another automobile.

While the body of the automobile, of which the frame 6 forms a part, is not shown, the frame 8 is positioned at an elevation which provides ample clearance between the roof 9 and the automobile body.

The invention resides in the supporting frame 8 which comprises a pair of racks 24 adjustably connected by a longitudinal strut 17 to form a unitary framed structure adapted to support one entire side of the automobile. The frame 8 is connected to the sidewall 10 and the floor 11 of the car so as to prevent movement of the automobile relative to the car and to rigidly connect the ends of the front and the rear axles together and thereby absorb the shocks and the strains to which the automobile is subjected when its axles have disconnected separate supports.

The racks 24 each comprise an upstanding channel member 15 and a pair of diagonally extending braces 20 and 21. The member 15 is connected to the floor 11 by an angle 16 which is provided with holes 25 adapted to receive screws or nails (not shown). In Fig. 6 is shown an alternative form of upstanding member in which the length is made adjustable by providing an upper channel member 40 which is telescoped over the lower channel member 15. The webs of the members 40 and 15 are provided with a plurality of equally spaced holes 42 and 43 respectively which register and permit the member to be lengthened or shortened as desired and the members to be fastened together by a plurality of bolts 44.

A hinge plate 19 provides a connection between the member 15 and the braces 20 and 21. This plate is journalled on a bolt 36 which extends through the flanges of the channel 15 or of the channel 40 of the alternative form and permits the plate and braces to be swung about the bolt as a horizontal axis. The braces 20 and 21 are each pivotally fastened to the hinge plate 19 by the rivets 26 so that the braces may be folded together or spaced apart at any desired angle and thereby adjust the device to different widths of wheel bases. The outer ends of the braces 20 and 21 are adapted for attachment to the side walls 10 of the car being provided for that purpose with transversely extending end portions 28 which have holes 28ª therein for the reception of screws or nails.

The upper end of the member 15 has its web portion provided with a recess 27 adapted to receive the hub 13 of the wheel 12 in supporting engagement. An angle 39 is mounted on the member 15 to reenforce its web and to provide additional bearing area for the hub, the outstanding leg of the angle being for this purpose curved or otherwise shaped to conform to the outer periphery of the hub 13.

The hub 13 is securely clamped in position on the channel member 15 by a pair of straps 29 which are fastened at one end to the flanges of the channel and at the other end are adjustably connected by a bolt 30. A ring 31 of rubber or other suitable packing material permits the straps 29 to be tightly clamped about the hub without scarring or otherwise damaging the same.

The strut 17 is adjustably connected to each of the channel members 15 by a bolt 32, the members 15 and the strut 17 being provided for that purpose with a plurality of holes 33 and 34 respectively. A brace 18 fastened at one end to the strut 17 and at the other end to the member 15 by bolts 35 serves to prevent relative rotation of the members 15 and the strut 17. The holes 34 in the strut 17 and the holes 33 in the members 15 are spaced apart in such an arrangement that when the members 15 are moved apart or together to accommodate automobiles of different wheel bases, the bar 18 can be correspondingly adjusted by mounting the bolts 35 in the proper adjacent holes 33 and 34.

The braces 20 and 21 together with the angle 16 are adapted to rigidly connect the racks 24 to the car wall 10 and floor 11 respectively and thereby prevent any movement of the automobile relative to the car. The strut 17 together with the braces 18 provide a rigid connection between the racks 24 on the same side of the automobile and transmit all of the stresses caused by the sudden stopping or starting of the car directly from one rack to the other and thereby prevent the frame of the automobile from being stressed and damaged in transit.

The frame is easily knocked down and the members comprising the same nested for reshipment by first swinging the braces 20 and 21 about their respective pivots 26 and then swinging them downwardly together about the bolt 36 as their common pivot until they lie against the web and between the flanges of the channel member 15. The members 15 may then be folded about the bolts 32 as pivots and along the strut 17 by removing a bolt 35 at either end of the brace 18 as desired.

Thus it will be seen that I have provided a frame adapted to support automobiles in transit in the upper portion of a freight car and to rigidly connect the automobile to the car, said frame being further adapted to relieve the automobile from the strains or shocks usually incident to such shipments. It is also obvious that the frame may be easily and economically constructed of standard structural steel members and of standard connecting members and can be readily collapsed and the parts nested together for advantageous and economical reshipment to the factory for further use.

Minor changes may be made in the various parts and combinations and arrangements thereof shown and described without departing from the spirit and the scope of the invention as claimed.

I claim as my invention:—

1. A vehicle shipping device comprising a pair of upwardly extending members each arranged at one side of the vehicle, means mounted on the upper portion of each of said members adapted for engaging a hub of the vehicle, means adapted to rigidly fasten said upwardly extending members to the side walls of a car, a longitudinally extending member pivotally connected at each end to one of said upwardly extending members below said hub supporting means and diagonally extending brace members connecting intermediate portions of said longitudinally extending member with said upwardly extending members.

2. A collapsible vehicle shipping device comprising a pair of upwarldy extending members arranged at one side of the vehicle and each having their upper end portions adapted for supporting reception of a hub of the vehicle, means for fastening the lower ends of said members to the floor of a car, a plurality of brace members each having one end pivotally fastened to said upwardly extending members and the other end adapted for attachment to the walls of a car and a longitudinally extending member pivotally fastened to each of said upwardly extending members.

3. In combination with a freight car, a vehicle therein and a pair of supporting structures for the vehicle, each of said structures comprising a pair of upwardly extending members arranged at one side of the vehicle, said members having means at their upper ends in supporting engagement with parts of the vehicle at the front and rear ends of the latter respectively, and having their lower ends rigidly fastened to the floor of the car, brace members pivotally connected at one end to each of said upwardly extending members and at the other end rigidly connected to the walls of the car, a longitudinally extending member pivotally connected at each end to the adjacent upwardly extending members, and diagonally extending brace members each connecting intermediate portions of said longitudinal member with the upwardly extending members, said diagonal brace members having pivotal connections at both ends with said longitudinal and upwardly extending members respectively.

4. A vehicle shipping device comprising a pair of upwardly extending channel members arranged at one side of the vehicle and each having their upper web portions apertured for supporting reception of a hub of the vehicle, each of said channel members having means adapted to hold the hub in position on the channel member comprising a pair of clamping bars fastened at one end to the flanges of said channel member and at the other end adjustably fastened together, said bars fitting snugly about the hub, means for fastening the lower ends of said channels to the floor of a car, a pair of brace members each having one end pivotally fastened to said channel members and the other end adapted for attachment to the wall of a car, and a longitudinal member connecting said channel members together.

5. In a device of the class described, a supporting member comprising an upwardly extending channel member having its upper web portion apertured for supporting reception of a hub of the vehicle, means for holding the hub in position comprising a pair of clamping bars fastened at one end to flanges of said channel member and at the other end adjustably fastened together, said bars fitting snugly about the hub, means for fastening the lower end of said channel to the floor of a car, and a pair of brace members each having one end pivotally fastened to said channel member and the other end adapted for attachment to the wall of a car.

6. A vehicle shipping device comprising a pair of upwardly extending channel members arranged at one side of the vehicle and each having their upper end portion adapted for supporting reception of a portion of the vehicle, a pair of brace members each having one end adapted for rigid connection to the wall of a car and the other end for connection with the channel member, means providing a pivotal and swinging connection between said brace members and channel member comprising a hinge plate journalled on a bolt extending through the flanges of said channel members, rivets pivotally connecting said brace members with said hinge plate whereby said brace members are adapted for independent rotation about the hinge plate and for swinging together about the bolt as an axis and a member connecting said upwardly extending channel members.

7. In a device of the class described, a supporting member comprising an upwardly extending channel member having its upper end portion adapted for supporting reception of a hub of a vehicle, a pair of brace members each having one end adapted for rigid connection to the wall of a car and the other end for connection with the channel member, means providing a pivotal and swinging connection between said brace members and channel member comprising a hinge plate journalled on a bolt extending through the flanges of said channel member, and rivets pivotally connecting said brace members with said hinge plate whereby said brace members are adapted for independent rotation about the hinge plate and for swinging together about the bolt as an axis.

8. A vehicle shipping device comprising a pair of upwardly extending channel members arranged at one side of the vehicle and each having their upper web portions apertured for supporting reception of a hub of the vehicle, each of said channel members having means adapted to hold the hub in position on the channel member comprising a pair of clamping bars fastened at one end to the flanges of said channel member and at the other end adjustably fastened together, said bars fitting snugly about the hub, means for fastening the lower ends of said channels to the floor of a car, a pair of brace members each having one end adapted for rigid connection to the wall of a car and the other end for connection with the channel member, means providing a pivotal and swinging connection between said brace members and channel member comprising a hinge plate journalled on a bolt extending through the flanges of said channel members, rivets pivotally connecting said brace members with said hinge plate whereby said brace members are adapted for independent rotation about the hinge plate and for swinging together about the bolt as an axis and a member connecting said upwardly extending channel members.

9. A vehicle shipping device comprising a pair of upwardly extending members each arranged at one side of the vehicle, means for adjusting the length of said members to different heights of vehicles and cars, means mounted on the upper portion of each of said members adapted for supporting engagement of a hub of the vehicle, brace members adapted to fasten the upwardly extending members to the side of a car, said brace members being adjustable to space said upwardly extending members from the side walls of a car as desired, and a longitudinal member connecting said upstanding members, said longitudinal member being adjustable to vary the spacing between said upstanding members to accommodate automobiles having different lengths of wheel bases.

10. A vehicle shipping device comprising a pair of upwardly extending members each arranged at one side of the vehicle, means mounted on the upper portion of each of said members adapted for supporting engagement of a hub of the vehicle, brace members adapted to fasten the upwardly extending members to the walls of a car, and a longitudinally extending member connecting said upstanding members, said longitudinal member being adjustable to vary the spacing between the upstanding members to accommodate automobiles having different lengths of wheel bases.

11. A vehicle shipping device comprising a pair of upwardly extending members each arranged at one side of the vehicle, means for adjusting the lengths of said members to different heighths of vehicles and cars, means on the upper portion of each of said members adapted for supporting engagement of the hub of a vehicle, and brace members adapted to fasten the upwardly extending members to the side walls of a car, said brace members being adjustable to space said upwardly extending members from the walls of the car as desired.

CHARLES L. MICHOD.